A. B. MACKLIN & H. J. WADDIE.
NUT LOCK.
APPLICATION FILED MAY 7, 1909.

972,460.

Patented Oct. 11, 1910.

WITNESSES

INVENTORS.
A. B. MACKLIN
H. J. WADDIE
BY
ATT'Y.

UNITED STATES PATENT OFFICE.

ATHOL BRANT MACKLIN, OF OTTAWA, AND HENRY JOHN WADDIE, OF HAMILTON, ONTARIO, CANADA.

NUT-LOCK.

972,460.  Specification of Letters Patent.   Patented Oct. 11, 1910.

Application filed May 7, 1909. Serial No. 494,705.

*To all whom it may concern:*

Be it known that we, ATHOL BRANT MACKLIN and HENRY JOHN WADDIE, of the cities of Ottawa and Hamilton, respectively, in the Province of Ontario, Canada, have invented certain new and useful Improvements in Nut-Locks, of which the following is a specification.

Our invention relates to improvements in nut locks of the type in which a locking pin operates in a recess formed in the shank of the bolt, and the objects of our invention are to provide an improved and more economical method of forming a slot in the shank, and such a method as will enable the formation to be accomplished with greater accuracy and with less cost.

Further objects are to provide means for insuring that the pin shall always bind against the nut, irrespective of any slight or almost imperceptible variation in the depth of the recess.

Further objects still are to provide an improved form of locking pin.

The invention is described in detail in the accompanying specification and drawings, and the particular features of novelty are pointed out in the claim.

Figure 1:
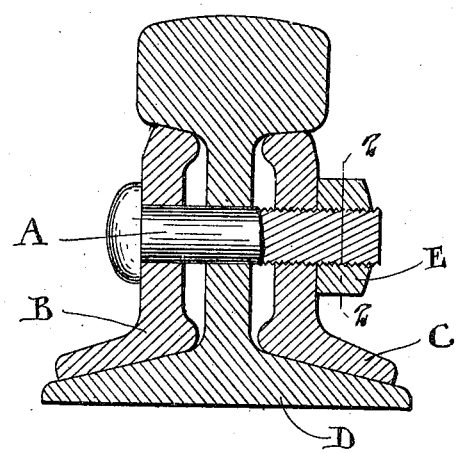
Figure 2:
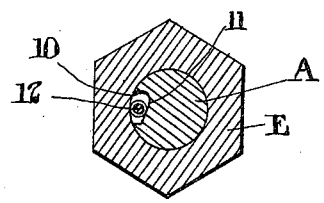
Figure 3:
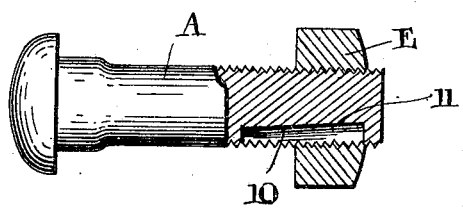
Figure 4:
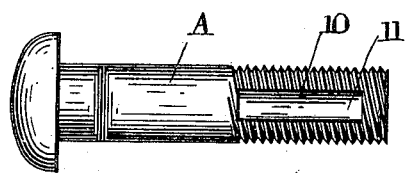
Figure 5:
Figure 6:
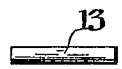
Figure 7:
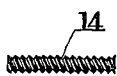

In the drawings:—Figure 1 is a vertical section through a form of track construction to which our nut lock may be applied. Fig. 2 is a section on the line 2—2, Fig. 1. Fig. 3 is a plan of the bolt and nut partially in section and without the locking pin. Fig. 4 is a side view of the bolt. Fig. 5 is a side view of one form of locking pin. Fig. 6 is a side view of an alternative form of locking pin. Fig. 7 is a plan of a further modified form of locking pin.

In the drawings, like figures of reference indicate corresponding parts in each figure.

In the process of forming a recess in the shank of a bolt, considerable difficulty has been experienced in forming the recess of proper size, and in such a manner as not to interfere with the threading on the bolt.

In place of cutting the recess by an ordinary milling machine, we press the same into the shank of the bolt, while in a red hot condition, by means of a suitable die, the said die being preferably operated in the process of forging the head of the bolt, whereby little cost, beyond the maintenance of the die, will be necessary. It is found, further, that if the recess extends completely to the end of the shank of the bolt, considerable difficulty is experienced in threading the same, as the threading die tends to sink into the recess and produce a crooked thread or one unequal in depth on opposite sides of the recess. To avoid this difficulty, we press the recess in the shank only to within a short distance, for example one-quarter inch, of the end of the bolt, thus presenting a perfectly round and unmutilated end for the threading die to engage with and properly center on before the thread is begun to be cut across the recess.

To further prevent inaccuracy in threading, a hollow guide or collet of inside diameter corresponding to the size of rod being operated on, may be attached to the face of the threading die, to further guide the same during threading of the bolt.

To further provide against slight inaccuracy in the depth of the recess, we have found it advisable to form the recess slightly tapered longitudinally, the recess being shallower at the end nearest the head of the bolt. This causes the locking pin to come in contact with the nut at its inner end, even if its outer end is free therefrom.

Referring to the embodiment of the invention illustrated in the drawings, A represents the bolt, which, in Fig. 1, is shown connecting two angle bars B and C on the sides of the rail D, and E represents the nut.

In accordance with the invention, a longitudinal recess 10 is formed in the side of the bolt, the said recess being gradually decreased in depth from the outer to the inner end thereof, and the outer end being terminated a short distance from the end of the bolt as indicated. The rear wall 11 of the recess is also inclined outwardly from top to bottom, whereby the locking pin 12 will be forced, by gravity, to locking position. This locking pin may have a variety of forms. The form shown in Fig. 5 is provided with annular corrugations, the pin 13 shown in Fig. 6 is formed plain, and the pin 14 shown in Fig. 7 is provided with screw-threading, the screw-threading being of the same pitch as that on the bolt and nut.

As many changes could be made in the above construction, and many apparently widely different embodiments of our invention, within the scope of the claim could be made without departing from the spirit or scope thereof, it is intended that all matter contained in the accompanying specification and drawings shall be interpreted as illustrative and not in a limiting sense.

What we claim as our invention is:

A nut lock of the character described, comprising a nut, a bolt formed with a threaded shank upon which said nut is screwed, said threaded shank having a recess adapted to receive a locking member, said recess being uniformly inclined longitudinally as well as transversely, the transverse inclination being such that in one position the locking member will be out of engagement with the threads on the nut and in another position will be engaged therewith and the longitudinal inclination such that as the nut is screwed on the bolt, the inner end of said locking member will be forced into engagement with the longitudinally inclined wall of said recess.

In witness whereof, we have hereunto set our hands in the presence of two witnesses.

ATHOL BRANT MACKLIN.
HENRY JOHN WADDIE.

Witnesses to the signature of Athol Brant Macklin:
RUSSEL S. SMART,
MARY C. LYON.

Witnesses to the signature of Henry John Waddie:
S. J. WASHINGTON,
W. J. JEFFREY.